Aug. 4, 1925.
H. G. BRIDGE
1,548,113
ANTISKID DEVICE
Filed Feb. 16, 1923
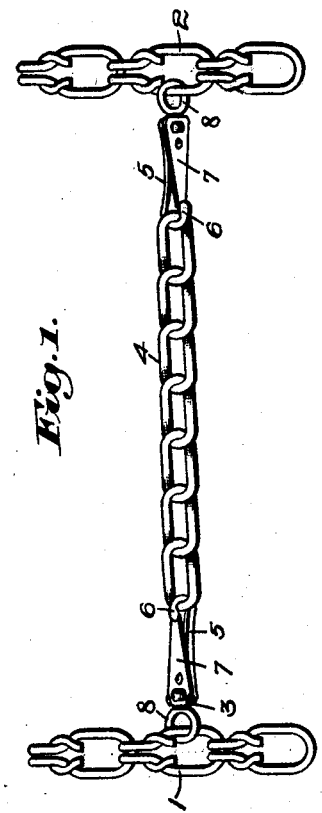
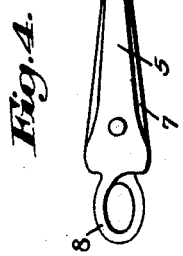
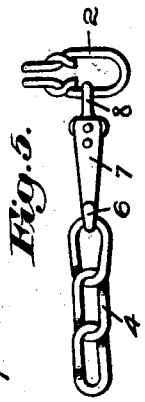
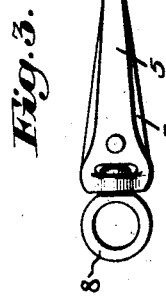
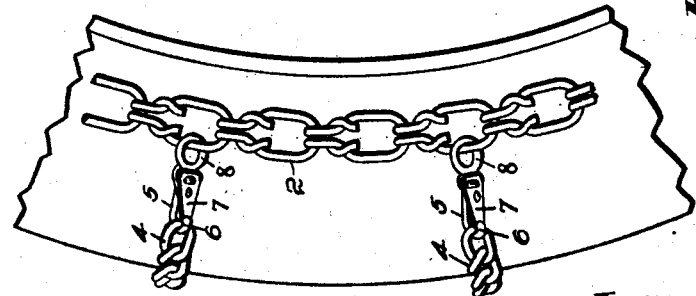
Inventor:
Harrison G. Bridge Patented Aug. 4, 1925.

1,548,113

UNITED STATES PATENT OFFICE.

HARRISON G. BRIDGE, OF BROOKLINE, MASSACHUSETTS.

ANTI-SKID DEVICE.

Application filed February 16, 1923. Serial No. 619,507.

*To all whom it may concern:*

Be it known that I, HARRISON G. BRIDGE, a citizen of the United States, and resident of Brookline, county of Norfolk, and Commonwealth of Massachusetts, have invented an Improvement in Anti-skid Devices, of which the following description, in connection with the accompanying drawings, is a specification, like characters on the drawings representing like parts.

This invention relates to anti-skid chains for automobiles and its object is to provide a novel chain of such nature, and particularly to provide a novel and improved means for quickly detaching and attaching cross chains to the side chains.

In the drawings of one embodiment of my invention illustrated and described herein, Fig. 1 is a plan view of a portion of each of two side chains with my novel means for connecting the cross chains to the same;

Fig. 2, a side view of a portion of one side chain and cross chains in place upon a tire;

Fig. 3, a detail lower face view of the cross and side chain connecting member;

Fig. 4, a modified form of the same;

Fig. 5, a plan of a further modified form of chain connecting means; and

Fig. 6, an edge view of the same.

Referring to Figs. 1, 2, my novel antiskid chains comprise a pair of conventional side chains 1, 2, commonly used for this purpose, one for each side of the tire, one only being shown in Fig. 2.

It is common at the present time to provide the cross chain at each end with a long open end link which is adapted to be closed upon one of the links in the side chain by a tool provided for that purpose. This is a very inconvenient arrangement, particularly when one is obliged to remove the old chain and substitute the new one on the road. The old chain must first be removed by a suitable tool. If the tire is on the wheel it is frequently very difficult to get access to the old chain, remove it and attach the new chain, particularly if the tire or shoe is oversize and the chains fit it closely.

To avoid this difficulty I have conceived the novel construction illustrated wherein a snap hook 3 is provided at proper points on each side chain and to which the cross chains 4 are connected. In such case the damaged chains 4 may quickly be detached from and the new one attached to the side chains without difficulty. The hook comprises the usual back member 5, bill 6, and leaf spring 7.

It is frequently the case that when one drives or backs up to a curbstone he will scrape the side of the tire against the curb in so doing. In such case if the chain or a snap hook should be caught between the tire and curb edgewise, the link or hook might cut the tire.

To avoid this danger, Fig. 1, I have provided a ring 8 to which the hook is pivotally connected so that the hook may naturally lie substantially on its side against the tire. Now in case the hook is squeezed between the curb and tire it will normally present a side, not front or back, to the tire without danger of cutting the same; and if it should happen that the edge of the hook is presented to the curb it will naturally turn about its swivel connection under pressure one way or the other, and present a side face to the tire and curb. By the pivoted construction described, the hook 3 is permitted always to lie substantially on its side or angularly, and thus in turn permit the links of the chain 4 to lie generally flat against the tire, thus guarding against cutting the tire by the edge of the links.

It will be obvious how readily cross chains can be attached and detached by this arrangement whether the chains are on the tires or not, and without regard to whether the car is on the road or in the garage. No tool of any kind is necessary.

In Fig. 4 I have shown a modified form of construction wherein the ring securing the hook to the side chain is not pivoted to the hook, but turned at an angle so that the hook may still lie on its side as in the first instance.

In Fig. 5 a modification is illustrated wherein the hook 5 is straight instead of offset or pivoted, and which may be used if, for any reason, it is preferred. In such case one end of the end link of the cross chain may be so fashioned that it will be substantially flat, Fig. 5, which the ordinary half twisted link, Figs. 1, 2, will not do.

This invention is not limited to the particular embodiment thereof described and illustrated, but is more particularly pointed out in the following claim:

In an anti-skid device comprising side chains and cross chains, means detachably connecting the cross chains to the side chains including swivel snap hooks and eyes, the bills of the hooks arranged normally to lie at oblique angles to the tire, and the cross chains presenting partially twisted end links cooperating with the bills of said snap hooks.

In testimony whereof, I have signed my name to this specification.

HARRISON G. BRIDGE.